United States Patent
Hapsari et al.

(10) Patent No.: US 8,326,300 B2
(45) Date of Patent: Dec. 4, 2012

(54) MOBILE COMMUNICATION METHOD AND EXCHANGE

(75) Inventors: Wuri Andarmawanti Hapsari, Yokosuka (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 339 days.

(21) Appl. No.: 12/681,312

(22) PCT Filed: Oct. 2, 2008

(86) PCT No.: PCT/JP2008/067925
§ 371 (c)(1),
(2), (4) Date: Jun. 29, 2010

(87) PCT Pub. No.: WO2009/044805
PCT Pub. Date: Apr. 9, 2009

(65) Prior Publication Data
US 2010/0279692 A1    Nov. 4, 2010

(30) Foreign Application Priority Data
Oct. 2, 2007  (JP) ................. 2007-259134

(51) Int. Cl.
*H04W 36/00* (2009.01)

(52) U.S. Cl. ........ 455/436; 370/331; 370/332; 455/437; 455/438; 455/439; 455/440; 455/441; 455/442

(58) Field of Classification Search ............ 455/436, 455/437, 438, 439, 440, 441, 442; 370/331, 370/332
See application file for complete search history.

(56) References Cited

U.S. PATENT DOCUMENTS

| | | | | |
|---|---|---|---|---|
| 8,107,433 | B2 * | 1/2012 | Jokinen | 370/331 |
| 8,131,295 | B2 * | 3/2012 | Wang et al. | 455/436 |
| 2008/0051091 | A1 * | 2/2008 | Phan et al. | 455/436 |

OTHER PUBLICATIONS

Samsung, "NAS forwarding for inter-ENB handover," 3GPP TSG-RAN WG3 Meeting #57, R3-071365, Aug. 20-24, 2007, 3 pages.
Huawei, "NAS message handling during X2 handover," 3GPP TSG RAN WG3 Meeting #57, R3-071463, Aug. 20-24, 2007, 3 pages.
3GPP TS 25.413 v7.7.0, "UTRAN Iu interface RANAP signalling," Sep. 2007, 359 pages.
"NAS Signalling in E-UTRAN," 3GPP TSG-RAN WG3 Meeting #54, R3-062003, Nov. 6-10, 2006, 1 page.
"LS on NAS Handling during intra-LTE handover," 3GPP TSG RAN WG3 Meeting #55bis, R3-070700, Mar. 27-30, 2007, 1 page.
International Search Report issued in PCT/JP2008/067925, mailed on Nov. 25, 2008, w/translation, 3 pages.
Written Opinion issued in PCT/JP2008/067925, mailed on Nov. 25, 2008, 3 pages.

* cited by examiner

*Primary Examiner* — Patrick Edouard
*Assistant Examiner* — Shantell L Heiber
(74) *Attorney, Agent, or Firm* — Osha Liang LLP (57) ABSTRACT

A mobile communication method according to the present invention includes the steps of: transmitting, from a NAS function to an S1-AP function, a NAS-PDU; transmitting, from the S1-AP function to the NAS function, a retransmission request for the NAS-PDU, when receiving a notification, which indicates completion of a handover of a mobile station (UE), from a handover target radio base station (eNB), after receiving an S1-AP response message, which indicates that transfer of the NAS-PDU to the mobile station (UE) through a radio interface has failed, from the handover source radio base station (eNB); and retransmitting, from the NAS function to the S1-AP function, the NAS-PDU, in response to the retransmission request.

8 Claims, 9 Drawing Sheets

| IE/Group Name | Presence | Range | IE type and reference | Semantics description | Criticality | Assigned Criticality |
|---|---|---|---|---|---|---|
| Message Type | M | | | | | |
| eNB S1-AP UE Identity | M | | | | | |
| MME S1-AP UE Identity | M | | | | | |
| NAS-PDU | M | | | | | |

| Type | Reserved | U | B | E | Length |
|---|---|---|---|---|---|
| TSN ||||||
| Stream Identifier S |||| Stream Sequence Number N ||
| Payload Protocol Identifier ||||||
| User Data (seq n of Stream S ) ||||||

MOBILE COMMUNICATION METHOD AND EXCHANGE

TECHNICAL FIELD

The present invention relates to a mobile communication method and an exchange with which, during handover of a mobile station, the exchange including a first protocol function to function as a first protocol and a second protocol function to function as a second protocol being a lower layer than the first protocol transmits a second protocol message containing a first protocol message to radio base stations each including a second protocol function to function as the second protocol, and each of the radio base stations transmits the first protocol message to the mobile station including a first protocol function to terminate the first protocol.

BACKGROUND ART

Figure 1:
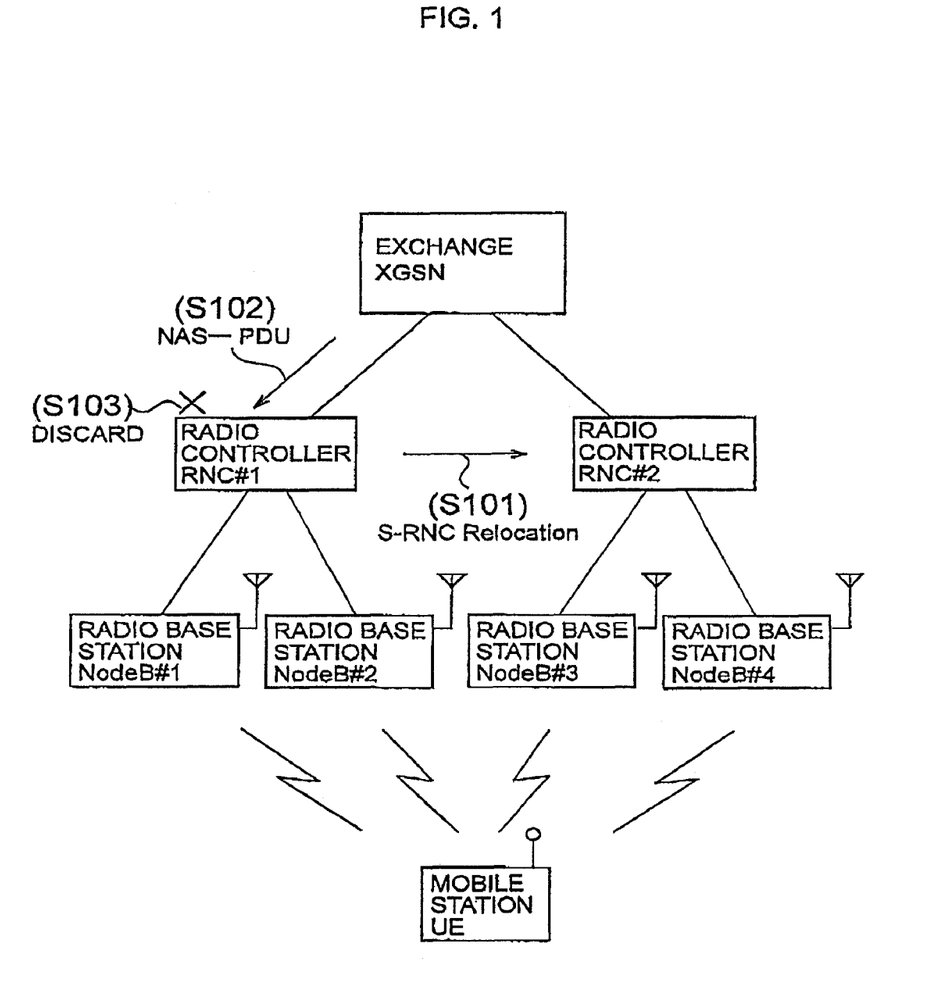
FIG. 1 is an overall configuration diagram of a mobile communication system according to a conventional art.

FIG. 1 shows the configuration of a mobile communication system including a conventional UTRAN (Universal Terrestrial Radio Access Network).

With reference to FIG. 1, description is given of an operation which is performed when an "S-RNC (Serving Radio Network Controller) Relocation" occurs in the above-described mobile communication system.

As shown in FIG. 1, in the mobile communication system, the "S-RNC Relocation" of a mobile station UE (User Equipment) from a radio controller RNC#1 to a radio controller RNC#2 occurs at step S101, and thereafter, an exchange XGSN transmits a "NAS-PDU (Non Access Stratum-Protocol Data Unit)" to the radio controller RNC#1 at step S102. In this case, the radio controller RNC#1 discards the NAS-PDU at step S103.

Non-Patent Document 1: 3GPP TS25.413 UTRAN Iu Interface RANAP Signaling

Non-Patent Document 2: 3GPP R3-062003 NAS Signaling in E-UTRAN

Non-Patent Document 3: R3-070700 LS on NAS handling during intra-LTE handover

As described above, in the conventional mobile communication system, the radio controller RNC#1 discards the NAS-PDU transmitted from the exchange XGSN during execution of an "S-RNC Relocation" of the mobile station UE from the radio controller RNC#1 to the radio controller RNC#2. Thus, there is a problem that the exchange XGSN cannot retransmit the NAS-PDU to the radio controller RNC#2.

Moreover, a mobile communication system based on the LTE (Long Term Evolution) standard has the same problem. During handover of a mobile station UE, a handover source radio base station eNB fails to transmit a NAS-PDU received from an exchange MME (Mobility Management Entity) to the mobile station UE, and discards the NAS-PDU. Consequently, the exchange MME cannot retransmit the NAS-PDU to a handover target radio base station eNB.

DISCLOSURE OF THE INVENTION

An object of the invention is to provide a mobile communication method and an exchange that implement a mechanism in a mobile communication system based on the LTE standard, the mechanism allowing an exchange MME to retransmit a NAS-PDU containing data addressed to a mobile station UE through a handover target radio base station eNB, when the exchange MME fails to transmit the NAS-PDU through a handover source radio base station eNB during handover of the mobile station UE.

A first aspect of the present invention is summarized as a mobile communication method in which, during handover of a mobile station, an exchange including a first protocol function to function as a first protocol and a second protocol function to function as a second protocol being a lower layer than the first protocol transmits a second protocol message containing a first protocol message to radio base stations each including a second protocol function to function as the second protocol, and each of the radio base stations transmits the first protocol message to the mobile station including a first protocol function to terminate the first protocol, the mobile communication method including the steps of: transmitting, from the first protocol function of the exchange to the second protocol function of the exchange, a first protocol layer message; transmitting, from the second protocol function of the exchange to a handover source radio base station, the second protocol message containing the first protocol message; transmitting, from the second protocol function of the exchange to the first protocol function of the exchange, a retransmission request for the first protocol layer message, when receiving a notification, which indicates completion of the handover of the mobile station, from a handover target radio base station, after receiving a second protocol response message, which indicates that transfer of the first protocol message to the mobile station through a radio interface has failed, from the handover source radio base station; retransmitting, from the first protocol function of the exchange to the second protocol function of the exchange, the first protocol layer message, in response to the retransmission request; and retransmitting, from the second protocol function to the handover target radio base station, the second protocol message containing the first protocol message.

In the first aspect, the mobile communication method can further include the steps of: starting, at the first protocol function of the exchange, a retransmission timer used to determine a retransmission timing of the first protocol layer message, when transmitting the first protocol layer message to the second protocol function of the exchange; and resetting, at the first protocol function of the exchange, the retransmission timer in response to a notification from the second protocol function of the exchange.

A second aspect of the present invention is summarized as a mobile communication method in which, during handover of a mobile station, an exchange including a first protocol function to function as a first protocol and a second protocol function to function as a second protocol being a lower layer than the first protocol transmits a second protocol message containing a first protocol message to radio base stations each including a second protocol function to function as the second protocol, and each of the radio base stations transmits the first protocol message to the mobile station including a first protocol function to terminate the first protocol, the mobile communication method including the steps of: transmitting, from the first protocol function of the exchange to the second protocol function of the exchange, a first protocol layer message; transmitting, from the second protocol function of the exchange to a handover source radio base station, the second protocol message containing the first protocol message; and retransmitting, from the second protocol function of the exchange to a handover target radio base station, the second protocol message containing the first protocol message, when receiving a notification, which indicates completion of the handover of the mobile station, from the handover target radio base station, after receiving a second protocol response message, which indicates that transfer of the first protocol message to the mobile station through a radio interface has failed, from the handover source radio base station.

In the second aspect, the mobile communication method can further include the steps of: starting, at the first protocol function of the exchange, a first retransmission timer used to determine a retransmission timing of the first protocol layer message, when transmitting the first protocol layer message to the second protocol function of the exchange; transmitting, from the second protocol function of the exchange to the first protocol function of the exchange, a notification indicating the completion of the handover of the mobile station, when receiving the notification from the handover target radio base station, after receiving the second protocol response message, which indicates that the transfer of the first protocol message to the mobile station through the radio interface has failed, from the handover source radio base station; and resetting, at the first protocol function of the exchange, the first retransmission timer in response to the notification from the second protocol function of the exchange.

In the second aspect, the mobile communication method can further include the steps of: starting, at the second protocol function of the exchange, a second retransmission timer used to determine a retransmission timing of the second protocol layer message, when transmitting the second protocol layer message to the handover source radio base station; and resetting, at the second retransmission timer, receiving a notification, which indicates the completion of the handover of the mobile station, from the handover target radio base station, after receiving the second protocol response message, which indicates that the transfer of the first protocol message to the mobile station through the radio interface has failed, from the handover source radio base station.

In the second aspect, the handover source radio base station can use a sequence number in the second protocol to specify the second protocol message whose transfer has failed.

In the second aspect, the handover source radio base station can use a sequence number in a protocol of a lower layer than the second protocol to specify the second protocol message whose transfer has failed.

A third aspect of the present invention is summarized as an exchange to be used in a mobile communication system in which, during handover of a mobile station, the exchange including a first protocol function to function as a first protocol and a second protocol function to function as a second protocol being a lower layer than the first protocol transmits a second protocol message containing a first protocol message to radio base stations each including a second protocol function to function as the second protocol, and each of the radio base stations transmits the first protocol message to the mobile station including a first protocol function to terminate the first protocol, wherein the first protocol function of the exchange is configured: to transmit a first protocol layer message to the second protocol function of the exchange, and to store the first protocol layer message in a buffer; and to retransmit the first protocol layer message stored in the buffer to the second protocol function of the exchange, in response to a retransmission request for the first protocol layer message received from the second protocol function of the exchange; and the second protocol function of the exchange is configured: to transmit a second protocol message containing the first protocol message received from the first protocol function of the exchange to a handover source radio base station; and to transmit the retransmission request to the first protocol function of the exchange, when receiving a notification, which indicates the completion of the handover of the mobile station, from a handover target radio base station, after receiving a second protocol response message, which indicates that transfer of the first protocol message to the mobile station through a radio interface has failed, from the handover source radio base station; and to retransmit the second protocol message containing the first protocol message received from the first protocol function of the exchange to the handover target radio base station.

In the third aspect, the first protocol function of the exchange can be configured to start a retransmission timer used to determine a retransmission timing of the first protocol layer message, when transmitting the first protocol layer message to the second protocol function of the exchange; and the first protocol function of the exchange can be configured to reset the retransmission timer in response to a notification from the second protocol function of the exchange.

A fourth aspect of the present invention is summarized as an exchange to be used in a mobile communication method in which, during handover of a mobile station, the exchange including a first protocol function to function as a first protocol and a second protocol function to function as a second protocol being a lower layer than the first protocol transmits a second protocol message containing a first protocol message to radio base stations each including a second protocol function to function as the second protocol, and each of the radio base station transmits the first protocol message to the mobile station including a first protocol function to terminate the first protocol, wherein the first protocol function of the exchange is configured to transmit a first protocol layer message to the second protocol function of the exchange; and the second protocol function of the exchange is configured: to transmit a second protocol message containing the first protocol message received from the first protocol function of the exchange to a handover source radio base station, and to store the second protocol message in a buffer; and to retransmit the second protocol message stored in the buffer to a handover target radio base station, when receiving a notification, which indicates completion of the handover of the mobile station, from the handover target radio base station, after receiving a second protocol response message, which indicates that transfer of the first protocol message to the mobile station through a radio interface has failed, from the handover source radio base station.

In the fourth aspect, the first protocol function of the exchange can be configured to start a first retransmission timer used to determine a retransmission timing of the first protocol layer message, when transmitting the first protocol layer message to the second protocol function of the exchange; and the second protocol function of the exchange can be configured to transmit a notification indicating the completion of the handover of the mobile station, to the first protocol function of the exchange, when receiving the notification from the handover target radio base station, after receiving the second protocol response message, which indicates that the transfer of the first protocol message to the mobile station through the radio interface has failed, from the handover source radio base station; and the first protocol function of the exchange can be configured to reset the retransmission timer in response to a notification from the second protocol function of the exchange.

In the fourth aspect, the second protocol function of the exchange can be configured to start a second retransmission timer used to determine a retransmission timing of the second protocol layer message, when transmitting the second protocol layer message to the handover source radio base station; and the second protocol function of the exchange can be configured to reset the second retransmission timer, when receiving a notification, which indicates the completion of the handover of the mobile station, from the handover target radio base station, after receiving the second protocol response message from the handover source radio base station, the second protocol response message indicating that the transfer of the first protocol message to the mobile station through the radio interface has failed, from the handover source radio base station.

BEST MODES FOR CARRYING OUT THE INVENTION

Figure 2:
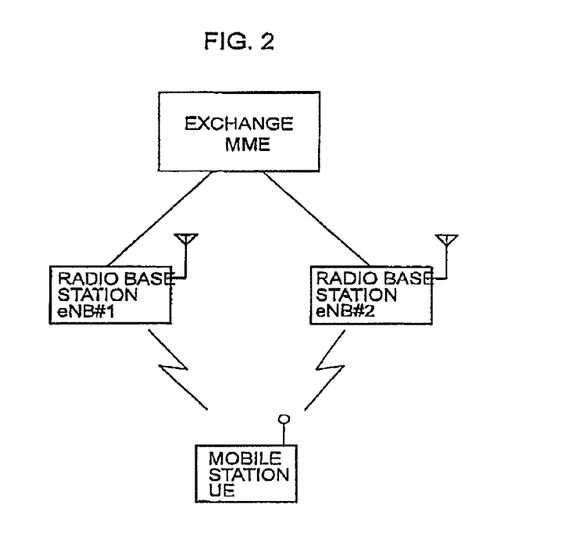
FIG. 2 is an overall configuration diagram of a mobile communication system according to a first embodiment of the invention.
Figure 3:
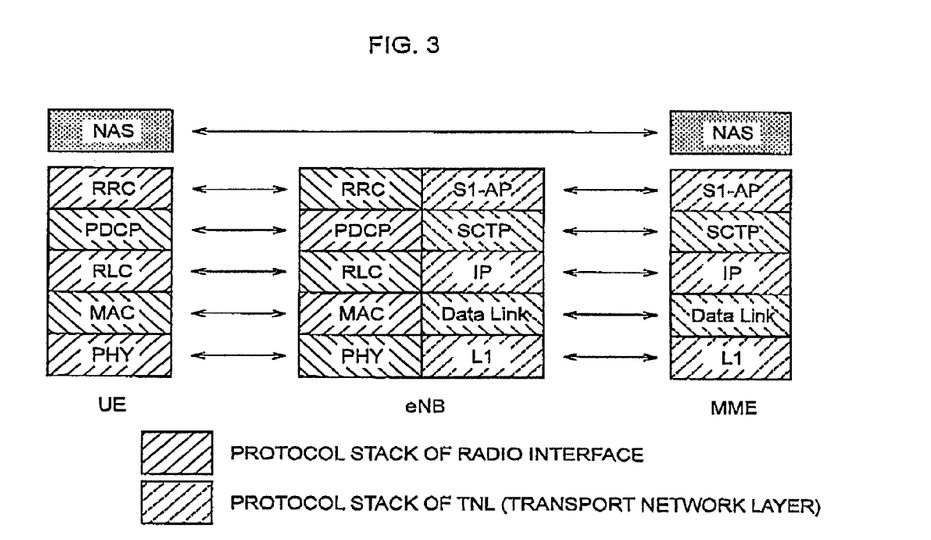
FIG. 3 is a view showing a protocol stack in the mobile communication system according to the first embodiment of the invention.
Figure 4:
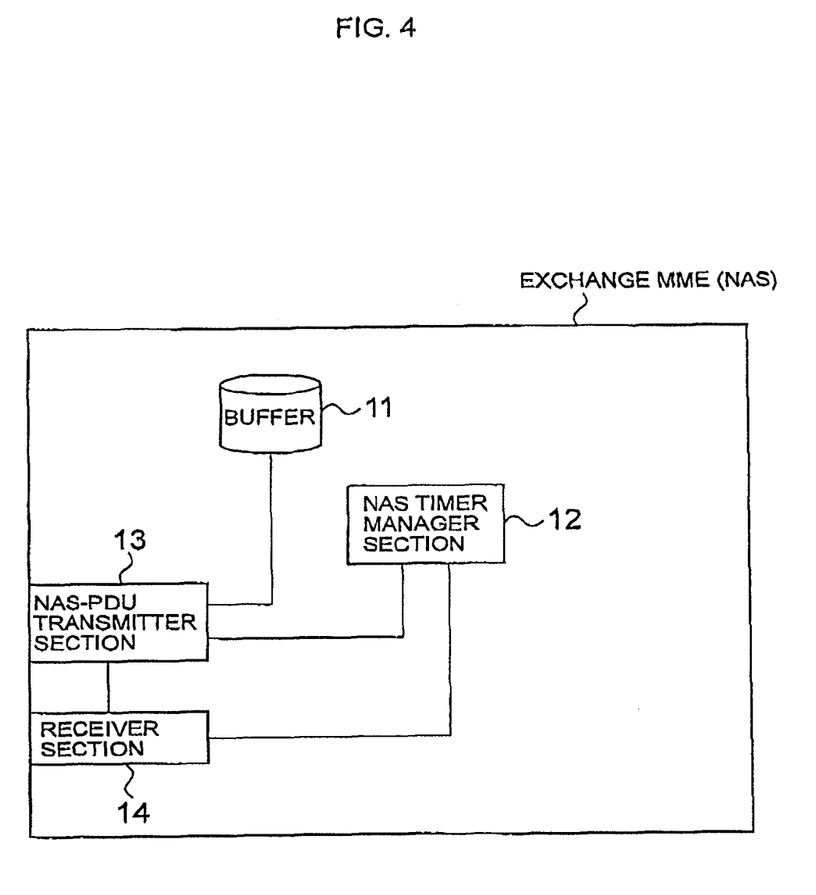
FIG. 4 is a functional block diagram of an exchange (a NAS function) according to the first embodiment of the invention.

Configuration of a Mobile Communication System According to a First Embodiment of the Invention The description is given of the configuration of a mobile communication system according to a first embodiment of the invention with reference to FIGS. 2 to 4.

In the present embodiment, the description is given of a mobile communication system which is a mobile communication system based on the LTE (Long Term Evolution) standard as an example. However, the invention is applicable to a mobile communication system other than the mobile communication system based on the LTE standard.

It should be noted that same reference signs are given to denote elements with same functions in all the drawings for illustrating embodiments, and the duplicated description is omitted.

As shown in FIG. 2, the mobile communication system according to the embodiment includes an exchange MME, multiple radio base stations eNB#1, eNB#2, and a mobile station UE.

The mobile communication system according to the embodiment has the following configuration. When handover of the mobile station UE (a hard handover) is performed between a handover source radio base station eNB#1 and a handover target radio base station eNB#2, the exchange MME transmits an S1-AP message (a second protocol message) containing a NAS-PDU (a first protocol message) to the handover source radio base station eNB#1 and the handover target radio base station eNB#2. Here, the exchange MME includes a NAS function (a first protocol function) to function as a NAS protocol (a first protocol) and an S1-AP function (a second protocol function) to function as an S1-AP protocol (a second protocol) being a lower layer than the NAS protocol (the first protocol), and the source radio base stations eNB#1, eNB#2 each includes the S1-AP function (the second protocol function). Then, the handover target radio base station eNB#2 transmits the NAS-PDU (the first protocol message) to the mobile station UE including the NAS function (the first protocol function) to terminate the NAS protocol.

The description is given of a protocol stack in the mobile communication system according to the embodiment with reference to FIG. 3.

As shown in FIG. 3, the mobile station UE and each of the radio base stations eNB can communicate with each other by using the protocol stack of a radio interface including a RRC (Radio Resource Control) layer, a PDCP (Packet Data Convergence Protocol) layer, a RLC (Radio Link Control) Layer, a MAC (Media Access Control) layer, and a physical layer, the layers included sequentially in this order from an upper layer.

In addition, each of the radio base stations eNB and the exchange MME can communicate with each other by using the protocol stack of a TNL (Transport Network Layer) including an S1-AP layer, an SCTP (Stream Control Transport Protocol) layer, an IP (Internet Protocol) layer, a data link layer, and an L1 layer, the layers included sequentially in this order from an upper layer.

Furthermore, the mobile station UE and the exchange MME can communicate with each other by using the NAS protocol.

As shown in FIG. 4, the NAS function (the first protocol function) of the exchange MME includes a buffer 11, a NAS timer manager section 12, a NAS-PDU transmitter section 13, and a receiver section 14.

The buffer 11 is configured to buffer the NAS-PDU (the first protocol message) transmitted to the S1-AP function (the second protocol function) of the exchange MME until the transmission of the NAS-PDU to the radio base station eNB is completed.

The NAS timer manager section 12 is configured to perform control of starting, resetting, and stopping a NAS timer (a retransmission timer) used to determine a timing of retransmitting the NAS-PDU.

For example, the NAS timer manager section 12 is configured to start the NAS timer, when the NAS-PDU transmitter section 13 transmits the NAS-PDU.

In addition, the NAS timer manager section 12 is configured to reset the NAS timer in response to a retransmission request for the NAS-PDU received from the S1-AP function of the exchange MME.

In addition, the NAS timer manager section 12 can instruct the NAS-PDU transmitter section 13 to retransmit the NAS-PDU, when the NAS timer expires.

The NAS-PDU transmitter section 13 is configured to transmit the NAS-PDU to the S1-AP function of the exchange MME.

In addition, the NAS-PDU transmitter section 13 is configured to retransmit the NAS-PDU to the S1-AP function of the exchange MME, when receiving an instruction made when the NAS timer expires from the NAS timer manager section 12.

Furthermore, when the receiver section 14 receives a retransmission request (a re-sending request) for the NAS-PDU from the S1-AP function of the exchange MME, the NAS-PDU transmitter section 13 is configured to retransmit the NAS-PDU corresponding to the request to the S1-AP function of the exchange MME.

The receiver section 14 is configured to receive data transmitted from the S1-AP function of the exchange MME.

For example, the receiver section 14 is configured to receive a notification from the S1-AP function of the exchange MME, the notification indicating that transfer of the NAS-PDU to the mobile station UE through the radio interface has failed in the radio base station eNB.

In addition, the receiver section 14 is configured to receive a retransmission request for the NAS-PDU from the S1-AP function of the exchange MME.

The S1-AP function of the exchange MME is configured to transmit the S1-AP message containing the NAS-PDU received from the NAS function of the exchange MME, to the handover source radio base station eNB#1.

In addition, the S1-AP function of the exchange MME is configured to transmit a retransmission request for a NAS-PDU to the NAS function of the exchange MME, when receiving a notification (HO Complete), which indicates completion of the handover of the mobile station UE, from the handover target radio base station eNB#2, after receiving an S1-AP response message, which indicates that the transfer of the NAS-PDU to the mobile station UE through the radio interface has failed, from the handover source radio base station eNB#1.

Furthermore, the S1-AP function of the exchange MME is configured to retransmit an S1-AP message containing the NAS-PDU received from the NAS function of the exchange MME, to the handover target radio base station eNB#2.

Figure 5:
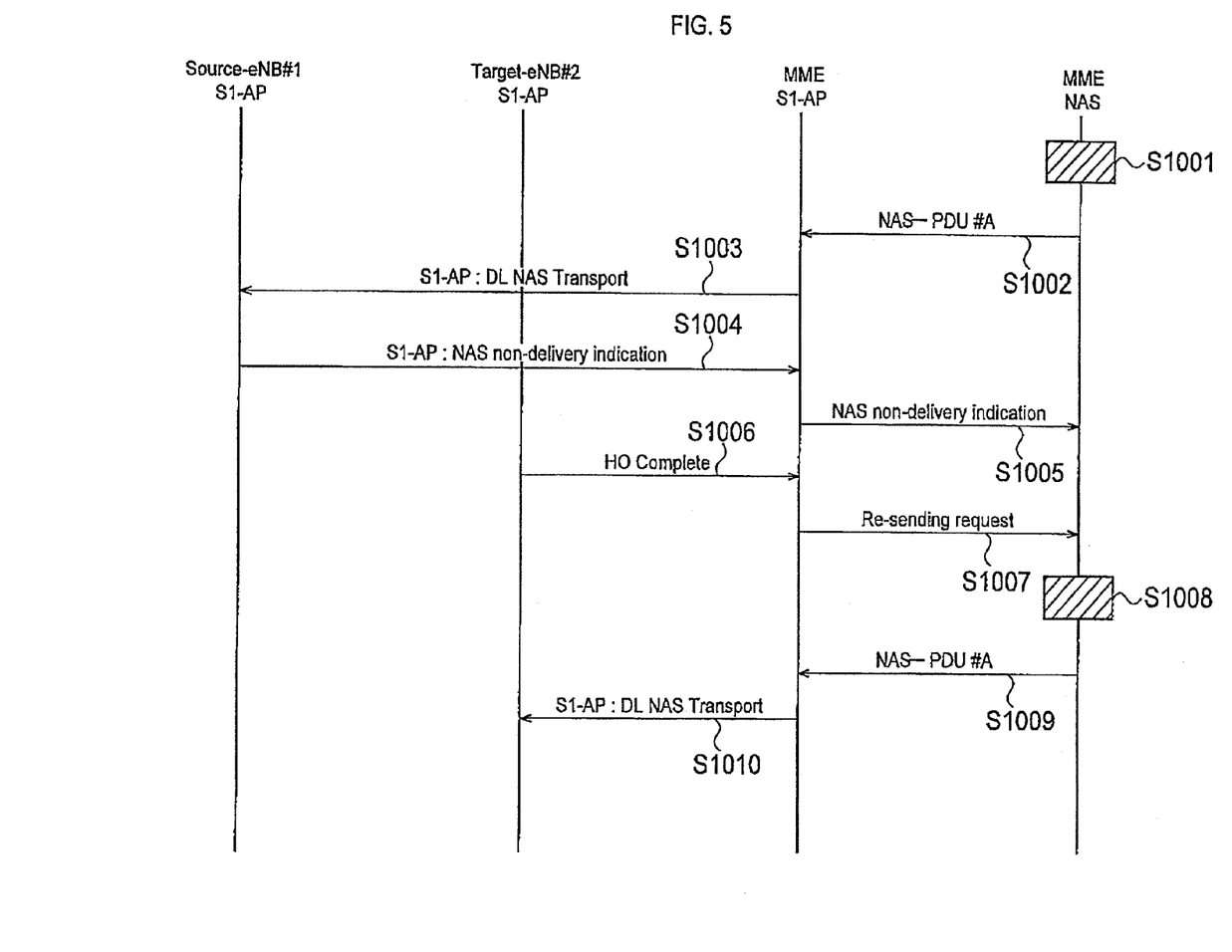
FIG. 5 is a sequential diagram showing an operation of the mobile communication system according to the first embodiment of the invention.

Operation of the Mobile Communication System According to the First Embodiment of the Invention The description is given of an operation during the handover of the mobile station UE in the mobile communication system according to the first embodiment of the invention with reference to FIG. 5.

As shown in FIG. 5, at step S1001, the NAS function of the exchange MME buffers a NAS-PDU#A containing data addressed to the mobile station UE and starts the NAS timer.

At step S1002, the NAS function of the exchange MME transmits the NAS-PDU#A to the S1-AP function of the exchange MME.

At step S1003, the S1-AP function of the exchange MME transmits an S1-AP message "DL NAS Transport" containing the NAS-PDU#A to the S1-AP function of the radio base station eNB#1 being the handover source of the mobile station UE.

At step S1004, the S1-AP function of the handover source radio base station eNB#1 transmits an S1-AP response message "NAS non-delivery indication" to the S1-AP function of the exchange MME, in order to notify the S1-AP function of the exchange MME about the failure of the transfer of the NAS-PDU to the mobile station UE through the radio interface.

At step S1005, the S1-AP function of the exchange MME notifies the NAS function of the exchange MME about the failure of the transfer of the NAS-PDU to the mobile station UE through the radio interface ("NAS non-delivery indication").

At step S1006, the radio base station eNB#2 being a handover target of the mobile station UE transmits "HO complete" indicating the completion of the handover of the mobile station UE to the S1-AP function of the exchange MME.

At step S1007, the S1-AP function of the exchange MME transmits a retransmission request (a re-sending request) for the NAS-PDU to the NAS function of the exchange MME in response to the received "HO Complete".

At step S1008, the NAS function of the exchange MME which has received the retransmission request before the NAS timer expires resets the NAS timer. Thereafter, at step S1009, the NAS function of the exchange MME retransmits the NAS-PDU to the S1-AP function of the exchange MME.

At step S1010, the S1-AP function of the exchange MME retransmits the S1-AP message, "DL NAS Transport", containing the NAS-PDU#A to the S1-AP function of the radio base station eNB#2 being the handover target of the mobile station UE.

Advantageous Effects of the Mobile Communication System according to the First Embodiment of the Invention According to the mobile communication system of the embodiment, in a mobile communication system based on the LTE standard, the S1-AP function of the exchange MME can notify the NAS function of the exchange MME about completion of handover of the mobile station UE by using an Inter-Layer Message when detecting the completion, and the NAS function of the exchange MME can retransmit the buffered NAS-PDU to the S1-AP function of the exchange MME. Accordingly, there can be implemented a mechanism that the exchange MME retransmits the NAS-PDU through the handover target radio base station eNB.

Mobile Communication System According to a Second Embodiment of the Invention

Figure 6:
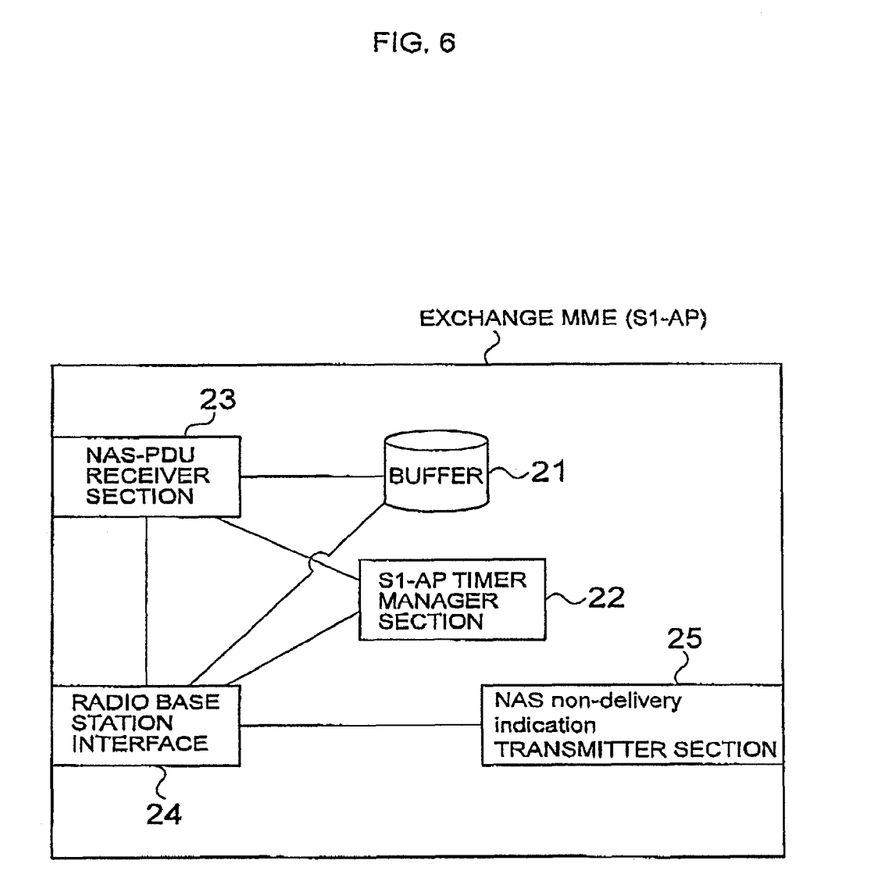
FIG. 6 is a functional block diagram of an exchange (an S1-AP function) according to a second embodiment of the invention.
Figure 7:
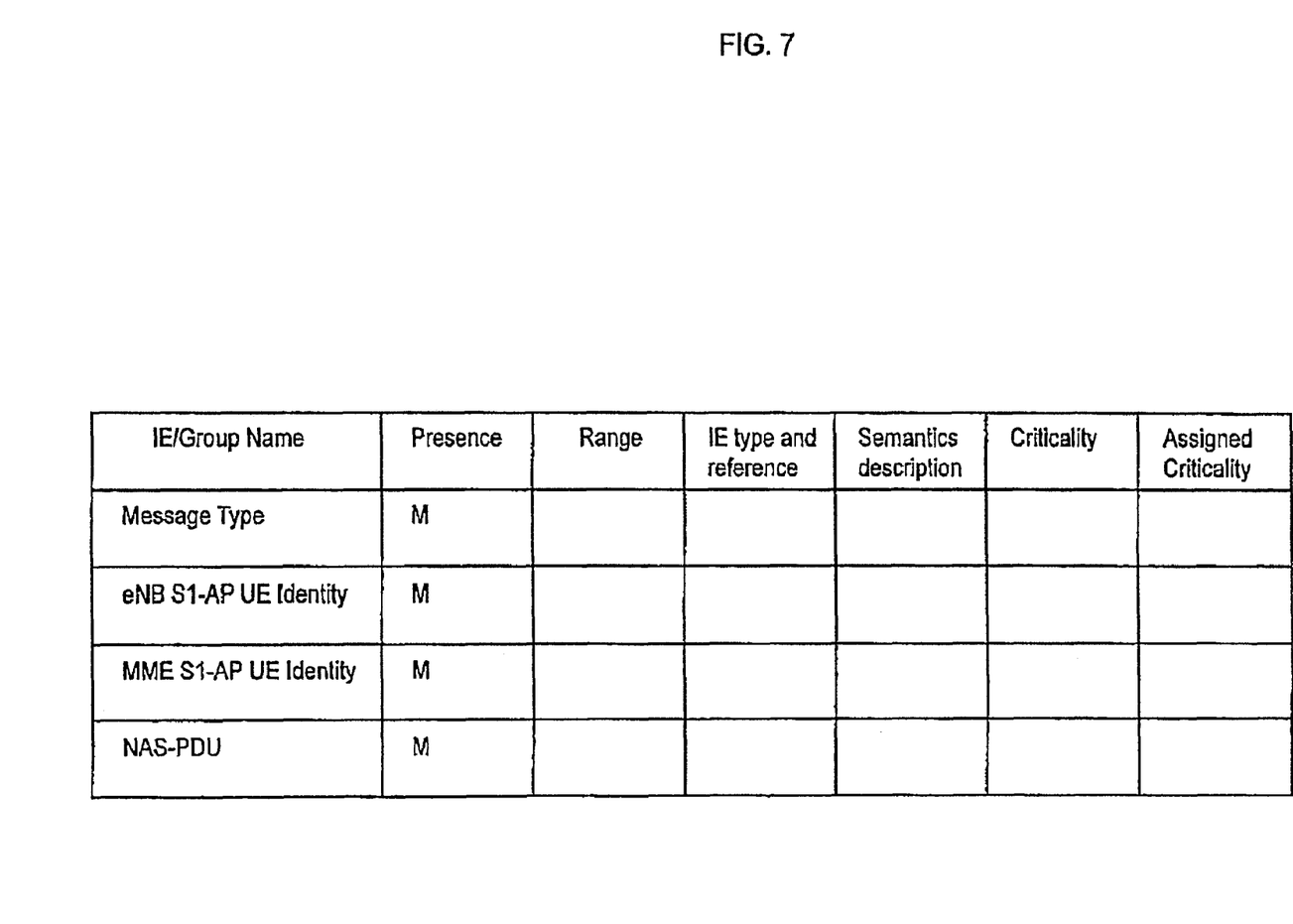
FIG. 7 is a view showing an example of a format of a "DL NAS Transport" message used in a mobile communication system according to the second embodiment of the invention.
Figure 8:
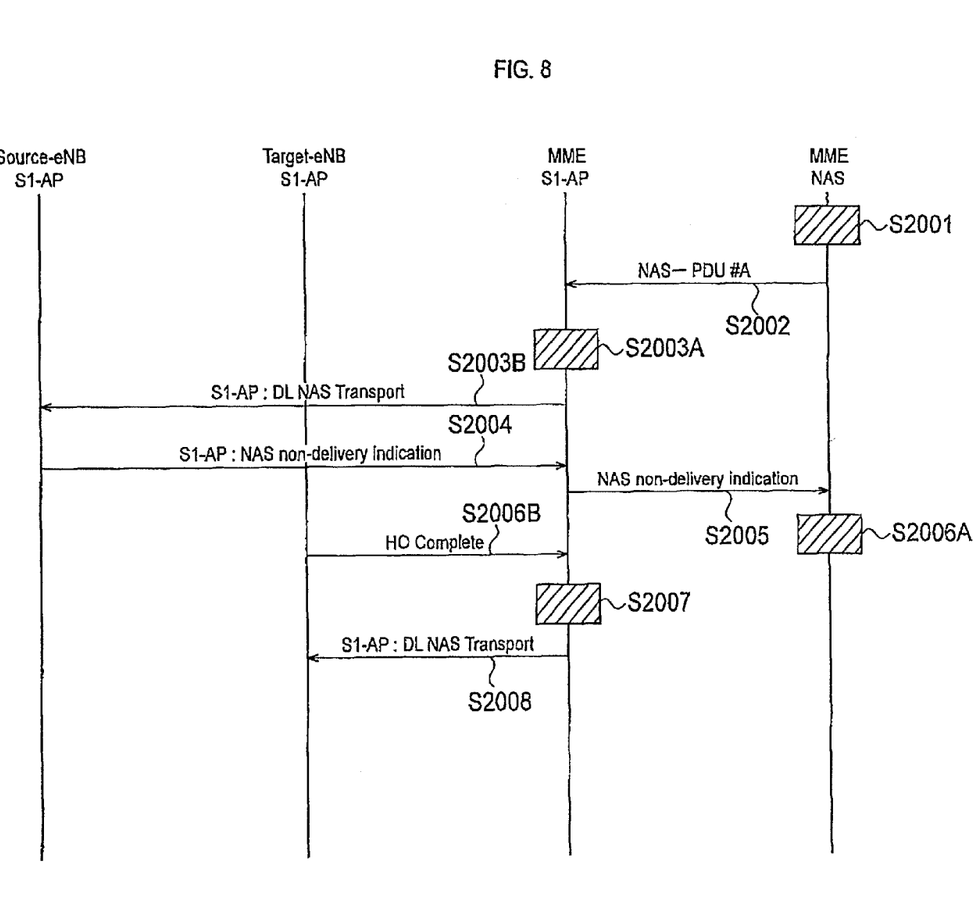
FIG. 8 is a sequential diagram showing an operation of the mobile communication system according to the second embodiment of the invention.

The description is given of a mobile communication system according to a second embodiment of the invention with reference to FIGS. 6 to 8. Hereinafter, the description is mainly given of points of the mobile communication system according the present embodiment which are different from the mobile communication system according to the first embodiment.

As shown in FIG. 6, an S1-AP function of an exchange MME according to the embodiment includes a buffer 21, an S1-AP timer manager section 22, a NAS-PDU receiver section 23, a radio base station interface 24, and a NAS non-delivery indication transmitter section 25.

The buffer 21 is configured to buffer an S1-AP message ("DL NAS Transport") transmitted to the S1-SP function of a radio base station eNB, until a transmission of the S1-AP message is completed.

The S1-AP timer manager section 22 is configured to perform control of starting, resetting, and stopping an S1-AP timer (a second retransmission timer) used to determine a timing of retransmitting the S1-AP message ("DL NAS Transport").

For example, the S1-AP timer manager section 22 is configured to start the S1-AP timer, when the radio base station interface 24 transmits the S1-AP message ("DL NAS Transport").

In addition, the S1-AP timer manager section 22 is configured to reset the S1-AP timer in response to an S1-AP response message ("NAS non-delivery indication") and "HO Complete" which are received from the S1-AP function of the radio base station eNB.

Moreover, the S1-AP timer manager section 22 can retransmit the S1-AP message ("DL NAS Transport") to the S1-AP function of the radio base station eNB, when the S1-AP timer expires.

Furthermore, the S1-AP timer manager section 22 is configured to reset the S1-AP timer, when the radio base station interface 24 receives a notification, which indicates completion of the handover of the mobile station UE ("HO Complete"), from the handover target radio base station eNB#2, after receiving the S1-AP response message ("NAS non-delivery indication"), which indicates that transfer of the above described S1-AP message ("DL NAS Transport") has failed, from the handover source radio base station eNB#1.

The NAS-PDU receiver section 23 is configured to receive NAS-PDU from the S1-AP function of the exchange MME.

The radio base station interface 24 is configured to receive and transmit data from and to the radio base station eNB.

For example, the radio base station interface 24 is configured to transmit the S1-AP message ("DL NAS Transport") containing the NAS-PDU received from the S1-AP function of the exchange MME to the radio base station eNB.

FIG. 7 shows an example of a format of the above-described S1-AP message ("DL NAS Transport").

In addition, the radio base station interface 24 is configured to receive the S1-AP response message ("NAS non-delivery indication"), "HO Complete", and the like, from the S1-AP function of the radio base station eNB#1.

Furthermore, the radio base station interface 24 is configured to retransmit a S1-AP message ("DL NAS Transport"), when receiving the notification indicating completion of the handover of the mobile station UE ("HO Complete") from the handover target radio base station eNB#2, after receiving an S1-AP response message ("NAS non-delivery indication"), which indicates that the transfer of the above-described S1-AP message ("DL NAS Transport") has failed, from the handover source radio base station eNB#1.

In addition, the NAS non-delivery indication transmitter section 25 is configured to transmit the notification ("NAS non-delivery indication"), when receiving a notification indicating completion of the handover of the mobile station UE ("HO Complete") from the handover target radio base station eNB#2, after receiving an S1-AP response message ("NAS non-delivery indication"), which indicates that the transfer of the above-described NAS-PDU to the mobile station UE through the radio interface has failed, from the handover source radio base station eNB#1.

The NAS function of the exchange MME is configured to transmit the NAS-PDU to the S1-AP function of the exchange MME and to start a NAS timer (a first retransmission timer).

In addition, the NAS function of the exchange MME is configured to reset the NAS timer in response to the notification ("NAS non-delivery indication") from the S1-AP function of the exchange MME.

Hereinafter, the description is given of an operation of handover of the mobile station UE in the mobile communication system according to the second embodiment of the invention with reference to FIG. 8.

As shown in FIG. 8, at step S2001, the NAS function of the exchange MME buffers the NAS-PDU#A containing data addressed to the mobile station UE and starts the NAS timer.

At step S2002, the NAS function of the exchange MME transmits the NAS-PDU#A to the S1-AP function of the exchange MME.

At step S2003A, the S1-AP function of the exchange MME buffers the S1-AP message "DL NAS Transport" containing the NAS-PDU#A and starts the S1-AP timer.

At step S2003B, the S1-AP function of the exchange MME transmits the S1-AP message "DL NAS Transport" containing the NAS-PDU#A to the S1-AP function of the radio base station eNB#1 being the handover source of the mobile station UE.

At step S2004, the S1-AP function of the handover source radio base station eNB#1 transmits the S1-AP response message "NAS non-delivery indication" to the S1-AP function of the exchange MME, the message indicating that the transfer of the NAS-PDU to the mobile station UE through the radio interface has failed.

At step S2005, the S1-AP function of the exchange MME notifies, to the NAS function of the exchange MME, the failure of the transfer of the NAS-PDU to the mobile station UE through the radio interface ("NAS non-delivery indication"). Then, at step S2006A, the NAS function of the exchange MME resets the NAS timer.

At step S2006B, the radio base station eNB#2 being a handover target of the mobile station UE transmits "HO Complete" which is the notification indicating the completion of the handover of the mobile station UE to the S1-AP function of the exchange MME.

At step S2007, in response to the received "HO Complete", the S1-AP function of the exchange MME resets the S1-AP timer. Then, at step S2008, the S1-AP function of the exchange MME retransmits the S1-AP message "DL NAS Transport" to the S1-AP function of the handover target radio base station eNB#2.

According to the mobile communication system of the embodiment, the S1-AP function of the exchange MME is configured to retransmit the S1-AP message "DL NAS Transport" containing the NAS-PDU to the radio base station eNB, and to notify the NAS function of the exchange MME about the above-described retransmission. Accordingly, the S1-AP function of the exchange MME and the NAS function of the exchange MME can avoid doubly retransmitting the NAS-PDU.

Mobile Communication System According to a Third Embodiment of the Invention

Figure 9:
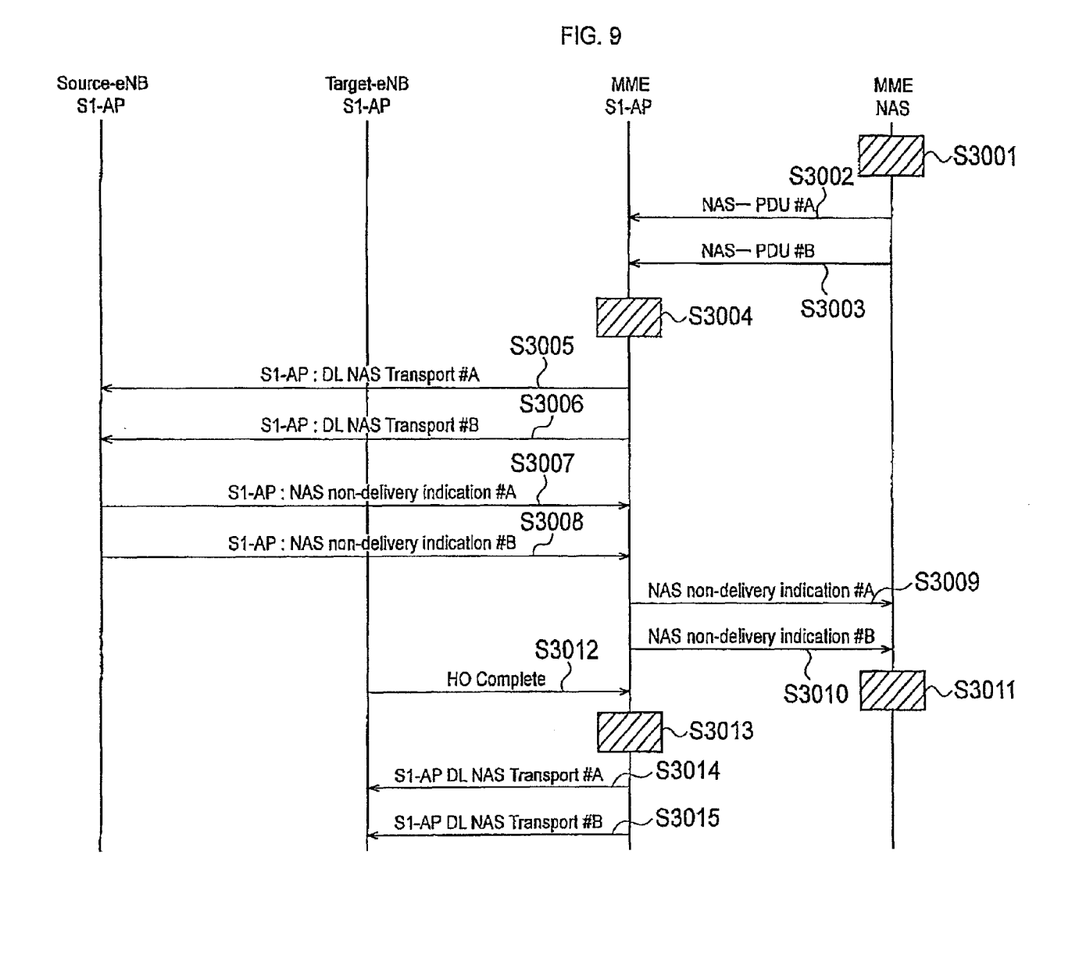
FIG. 9 is a sequential diagram showing an operation of a mobile communication system according to a third embodiment of the invention.
Figure 10:
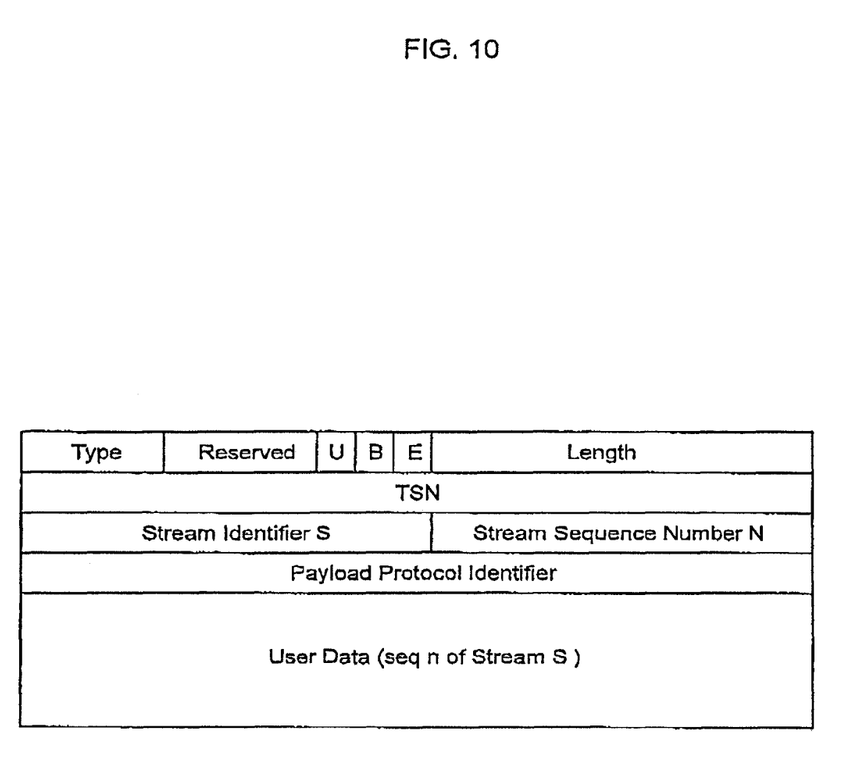
FIG. 10 is a view showing an example of a format of payload data used in an STOP used in the mobile communication system according to the third embodiment of the invention.

The description is given of a mobile communication system according to a third embodiment of the invention with reference to FIGS. 9 and 10. Hereinafter, the description is mainly given of points of the mobile communication system according to the present embodiment which are different from the above-described mobile communication systems according to the first and second embodiments.

As shown in FIG. 9, at step S3001, a NAS function of an exchange MME buffers a NAS-PDU #A and a NAS-PDU #B containing data addressed to a mobile station UE, and starts a NAS timer (A) and a NAS timer (B) which respectively correspond to the NAS-PDU #A and the NAS-PDU #B.

The NAS function of the exchange MME transmits the NAS-PDU #A to a S1-AP function of the exchange MME at step S3002, and transmits the NAS-PDU #B to the S1-AP function of the exchange MME at step S3003.

At step S3004, the S1-AP function of the exchange MME buffers an S1-AP message "DL NAS Transport #A" containing the NAS-PDU #A and an S1-AP message "DL NAS Transport #B" containing NAS-PDU #B, and starts the S1-AP timer (A) and the S1-AP timer (B) which respectively correspond to "DL NAS Transport #A" and "DL NAS Transport #B".

The S1-AP function of the exchange MME transmits the S1-AP message "DL NAS Transport #A" containing the NAS-PDU #A to the S1-AP function of a radio base station eNB#1 being a handover source of the mobile station UE at step S3005, and transmits the S1-AP message "DL NAS Transport #B" containing the NAS-PDU #B to the S1-AP function of the radio base station eNB#1 at step S3006.

The S1-AP function of the handover source radio base station eNB#1 transmits an S1-AP response message "NAS non-delivery indication #A" to the S1-AP function of the exchange MME at step S3007, the message indicating that transfer of the NAS-PDU #A to the mobile station UE through a radio interface has failed, and transmits an S1-AP response message "NAS non-delivery indication #B" to the S1-AP function of the exchange MME at step S3008, the message indicating that transfer of the NAS-PDU #B to the mobile station UE through the radio interface has failed.

Here, the handover source radio base station eNB#1 may use a sequence number in the S1-AP protocol to specify the "DL NAS Transport" whose transfer to the mobile station UE has failed.

In addition, the handover source radio base station eNB#1 may use a sequence number in a protocol (e.g. SCTP) in a lower layer than the S1-AP protocol to specify the "DL NAS Transport" whose transfer to the mobile station UE has failed.

FIG. 10 shows an example of a format of a payload data which is used in the SCTP. Here, the handover source radio base station eNB#1 may use a "Stream Sequence Number N" contained in payload data used in the SCTP to specify the "DL NAS Transport" whose transfer to the mobile station UE has failed.

Furthermore, the handover source radio base station eNB#1 may send back the "DL NAS Transport" whose transfer to the mobile station UE has failed to the S1-AP function of the exchange MME, to specify the "DL NAS Transport" whose transfer to the mobile station UE has failed.

The S1-AP function of the exchange MME notifies the NAS function of the exchange MME about the failure of the transfer of the NAS-PDU #A to the mobile station UE through the radio interface ("NAS non-delivery indication #A") at step S3009, and notifies the NAS function of the exchange MME about the failure of the transfer of the NAS-PDU #B to the mobile station UE through the radio interface ("NAS non-delivery indication #B") at step S3010.

At step S3011, the NAS function of the exchange MME resets the NAS timer (A) and the NAS timer (B).

At step S3012, a radio base station eNB#2 being handover target of the mobile station UE transmits "HO Complete", which is a notification indicating a completion of handover of the mobile station UE, to the S1-AP function of the exchange MME.

At step S3013, the S1-AP function of the exchange MME resets the S1-AP timer (A) and the S1-AP timer (B) in response to the received "HO Complete".

The S1-AP function of the exchange MME retransmits the S1-AP message "DL NAS Transport #A" to the S1-AP function of the handover target radio base station eNB#2 at step S3014, and retransmits the S1-AP message "DL NAS Transport #B" to the S1-AP function of the handover target radio base station eNB#2 at step S3015.

According to the mobile communication system of the embodiment, even when multiple NAS-PDUs occur simultaneously, any discarded NAS-PDU can be specified and retransmitted.

It should be noted that the operations of the mobile station UE, the radio base stations eNB, and the exchange MME may be implemented by hardware, a software module executed by a processor, or a combination thereof.

The software module may be provided in a storage medium in any form, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The above-described storage medium is connected to the processor so that the processor can read and write information from and in the storage medium. Also, the above-described storage medium may be integrated with the processor. Moreover, the above-described storage medium and the processor may be provided in an ASIC. The ASIC may be provided in the mobile station UE and the radio base stations eNB. In addition, the storage medium and the processor may be provided in each of the mobile station UE and the radio base stations eNB as a discrete component.

As described above, the invention is described in detail by using the above-described embodiments. However, it is obvious for a person skilled in the art that the invention is not limited to the embodiments described herein. The invention can be implemented in an improved or modified form without departing from the gist and the scope of the invention which are defined by the scope of claims. Accordingly, what is described in the present description aims to illustrate the invention and does not have any intend to limit the invention.

It should be noted that the entire contents of Japanese Patent Application No. 2007-259134 (filed Oct. 2, 2007) are incorporated herein by reference.

FIELD OF THE INDUSTRIAL APPLICATION

As described above, the present invention can provide such a mobile communication method and an exchange that can implement a structure in which, in mobile communication system based on the LTE standard, when handover of a mobile station UE is being performed and the exchange MME failed to transmit a NAS-PDU containing data addressed to the mobile station UE through a handover source radio base station eNB, the exchange MME retransmits the NAS-PDU through the handover target radio base station eNB.

The invention claimed is:

1. A mobile communication method in which, during handover of a mobile station, an exchange including a first protocol function to function as a first protocol and a second protocol function to function as a second protocol being a lower layer than the first protocol transmits a second protocol message containing a first protocol message to radio base stations each including a second protocol function to function as the second protocol, and each of the radio base stations transmits the first protocol message to the mobile station including a first protocol function to terminate the first protocol, the mobile communication method comprising the steps of:

transmitting, from the first protocol function of the exchange to the second protocol function of the exchange, a first protocol layer message;

starting, at the first protocol function of the exchange, a retransmission timer used to determine a retransmission timing of the first protocol layer message, when transmitting the first protocol layer message to the second protocol function of the exchange;

transmitting, from the second protocol function of the exchange to a handover source radio base station, the second protocol message containing the first protocol message;

transmitting, from the second protocol function of the exchange to the first protocol function of the exchange, a retransmission request for the first protocol layer message, when receiving a notification, which indicates completion of the handover of the mobile station, from a handover target radio base station, after receiving a second protocol response message, which indicates that transfer of the first protocol message to the mobile station through a radio interface has failed, from the handover source radio base station;

retransmitting, from the first protocol function of the exchange to the second protocol function of the exchange, the first protocol layer message, in response to the retransmission request;

retransmitting, from the second protocol function to the handover target radio base station, the second protocol message containing the first protocol message; and resetting, at the first protocol function of the exchange, the retransmission timer in response to a notification from the second protocol function of the exchange.

2. A mobile communication method in which, during handover of a mobile station, an exchange including a first protocol function to function as a first protocol and a second protocol function to function as a second protocol being a lower layer than the first protocol transmits a second protocol message containing a first protocol message to radio base stations each including a second protocol function to function as the second protocol, and each of the radio base stations transmits the first protocol message to the mobile station including a first protocol function to terminate the first protocol, the mobile communication method comprising the steps of:

transmitting, from the first protocol function of the exchange to the second protocol function of the exchange, a first protocol layer message;

starting, at the first protocol function of the exchange, a first retransmission timer used to determine a retransmission timing of the first protocol layer message, when transmitting the first protocol layer message to the second protocol function of the exchange;

transmitting, from the second protocol function of the exchange to a handover source radio base station, the second protocol message containing the first protocol message;

transmitting, from the second protocol function of the exchange to the first protocol function of the exchange, a notification indicating the completion of the handover of the mobile station, when receiving the notification from the handover target radio base station, after receiving a second protocol response message, which indicates that the transfer of the first protocol message to the mobile station through the radio interface has failed, from the handover source radio base station;

retransmitting, from the second protocol function of the exchange to a handover target radio base station, the second protocol message containing the first protocol message, when receiving the notification from the handover target radio base station, after receiving the second protocol response message from the handover source radio base station; and resetting, at the first protocol function of the exchange, the first retransmission timer in response to the notification from the second protocol function of the exchange.

3. The mobile communication method according to claim 2, further comprising the steps of:

starting, at the second protocol function of the exchange, a second retransmission timer used to determine a retransmission timing of the second protocol layer message, when transmitting the second protocol layer message to the handover source radio base station; and resetting, at the second retransmission timer, receiving a notification, which indicates the completion of the handover of the mobile station, from the handover target radio base station, after receiving the second protocol response message, which indicates that the transfer of the first protocol message to the mobile station through the radio interface has failed, from the handover source radio base station.

4. The mobile communication method according to claim 2, wherein the handover source radio base station uses a sequence number in the second protocol to specify the second protocol message whose transfer has failed.

5. The mobile communication method according to claim 2, wherein the handover source radio base station uses a sequence number in a protocol of a lower layer than the second protocol to specify the second protocol message whose transfer has failed.

6. An exchange to be used in a mobile communication system in which, during handover of a mobile station, the exchange including a first protocol function to function as a first protocol and a second protocol function to function as a second protocol being a lower layer than the first protocol transmits a second protocol message containing a first protocol message to radio base stations each including a second protocol function to function as the second protocol, and each of the radio base stations transmits the first protocol message to the mobile station including a first protocol function to terminate the first protocol, wherein the first protocol function of the exchange is configured:

to transmit a first protocol layer message to the second protocol function of the exchange, and to store the first protocol layer message in a buffer;

to start a retransmission timer used to determine a retransmission timing of the first protocol layer message, when transmitting the first protocol layer message to the second protocol function of the exchange;

to retransmit the first protocol layer message stored in the buffer to the second protocol function of the exchange, in response to a retransmission request for the first protocol layer message received from the second protocol function of the exchange; and to reset the retransmission timer in response to a notification from the second protocol function of the exchange; and the second protocol function of the exchange is configured:

to transmit a second protocol message containing the first protocol message received from the first protocol function of the exchange to a handover source radio base station; and to transmit the retransmission request to the first protocol function of the exchange, when receiving a notification, which indicates the completion of the handover of the mobile station, from a handover target radio base station, after receiving a second protocol response message, which indicates that transfer of the first protocol message to the mobile station through a radio interface has failed, from the handover source radio base station; and to retransmit the second protocol message containing the first protocol message received from the first protocol function of the exchange to the handover target radio base station.

7. An exchange to be used in a mobile communication method in which, during handover of a mobile station, the exchange including a first protocol function to function as a first protocol and a second protocol function to function as a second protocol being a lower layer than the first protocol transmits a second protocol message containing a first protocol message to radio base stations each including a second protocol function to function as the second protocol, and each of the radio base station transmits the first protocol message to the mobile station including a first protocol function to terminate the first protocol, wherein
the first protocol function of the exchange is configured to transmit a first protocol layer message to the second protocol function of the exchange;
to start a first retransmission timer used to determine a retransmission timing of the first protocol layer message, when transmitting the first protocol layer message to the second protocol function of the exchange; and
to reset the retransmission timer in response to a notification from the second protocol function of the exchange; and
the second protocol function of the exchange is configured:
to transmit a second protocol message containing the first protocol message received from the first protocol function of the exchange to a handover source radio base station, and to store the second protocol message in a buffer;
to transmit a notification indicating the completion of the handover of the mobile station, to the first protocol function of the exchange, when receiving the notification from the handover target radio base station, after receiving the second protocol response message, which indicates that the transfer of the first protocol message to the mobile station through the radio interface has failed, from the handover source radio base station; and
to retransmit the second protocol message stored in the buffer to a handover target radio base station, when receiving the notification from the handover target radio base station, after receiving the second protocol response message from the handover source radio base station.

8. The exchange according to claim 7, wherein
the second protocol function of the exchange is configured to start a second retransmission timer used to determine a retransmission timing of the second protocol layer message, when transmitting the second protocol layer message to the handover source radio base station; and
the second protocol function of the exchange is configured to reset the second retransmission timer, when receiving a notification, which indicates the completion of the handover of the mobile station, from the handover target radio base station, after receiving the second protocol response message from the handover source radio base station, the second protocol response message indicating that the transfer of the first protocol message to the mobile station through the radio interface has failed, from the handover source radio base station.

* * * * *